D. T. AND C. C. KEENAN.
AUTOMOBILE OR TIRE THEFT ALARM.
APPLICATION FILED NOV. 22, 1917.
1,310,349.
Patented July 15, 1919.
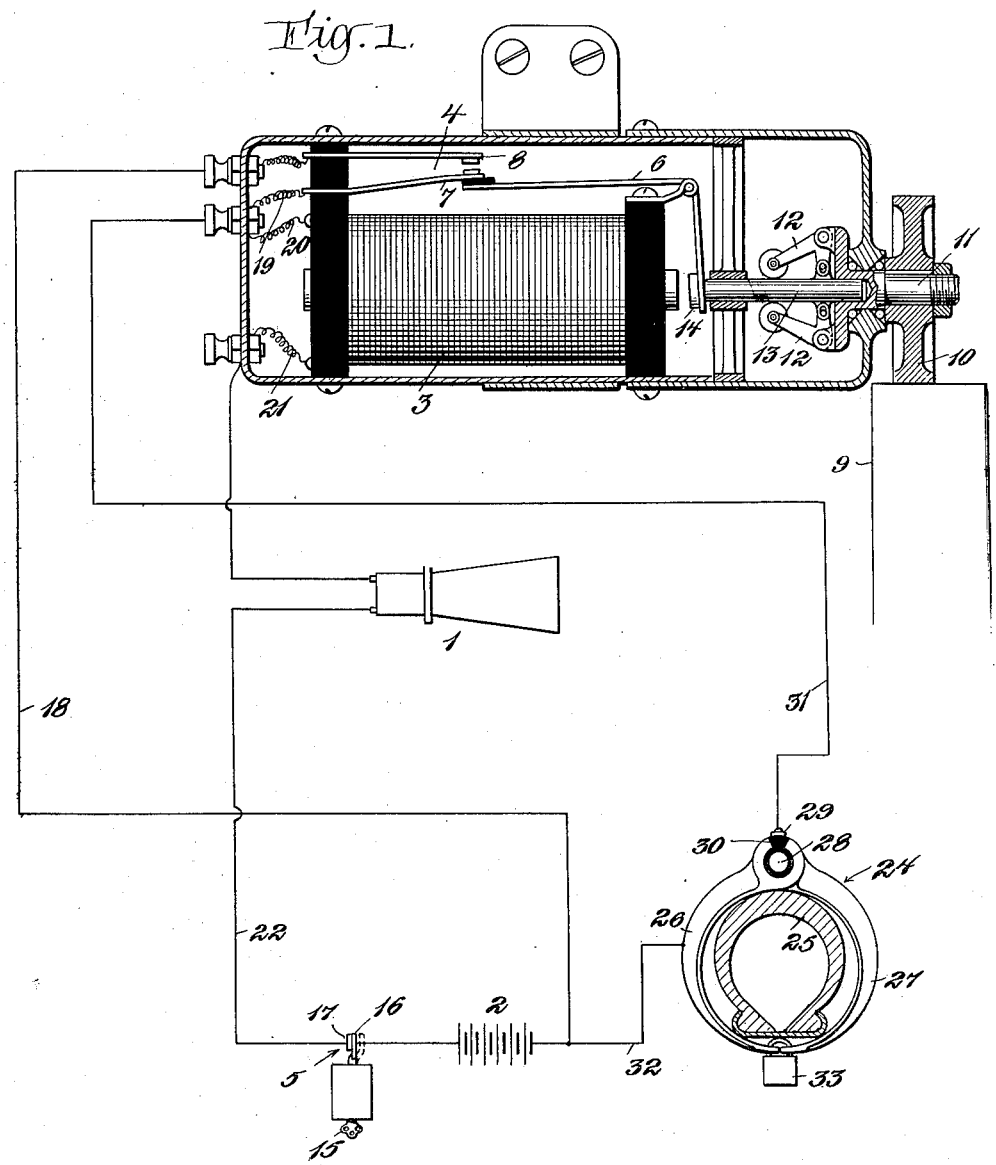
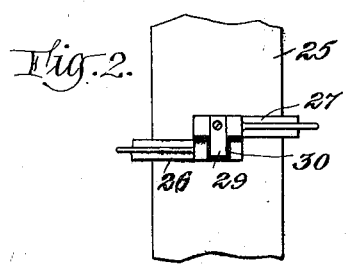
WITNESSES
Frederick Diehl.
C. Bradway
INVENTORS
D. T. Keenan
C. C. Keenan
BY
ATTORNEYS

UNITED STATES PATENT OFFICE.

DANIEL THOMAS KEENAN AND CATHERINE CELIA KEENAN, OF PHILADELPHIA, PENNSYLVANIA.

AUTOMOBILE OR TIRE THEFT ALARM.

1,310,349.   Specification of Letters Patent.   Patented July 15, 1919.

Application filed November 22, 1917. Serial No. 203,343.

*To all whom it may concern:*

Be it known that we, DANIEL T. KEENAN and CATHERINE C. KEENAN, citizens of the United States, and residents of Philadelphia, in the county of Philadelphia and State of Pennsylvania, have invented a new and Improved Automobile or Tire Theft Alarm, of which the following is a full, clear, and exact description.

This invention relates to a theft alarm especially adapted for use in connection with automobiles so as to indicate the theft of the automobile or of the spare tire, tools from the tool box, or any other part of the equipment which is liable to be stolen.

The invention has for its general objects to provide a novel mechanical, electrical or other automatic device of this character which is comparatively simple and inexpensive to manufacture and install, reliable and efficient in use, and so designed that the alarm will be a continuous one when a theft is attempted, so as to reveal the fact to the public or the police authorities.

A more specific object of the invention is to provide an electric system having a horn in combination with a circuit closer which is mechanically closed by the movement of a part which moves when the motor operates or the car travels and which is held closed by a magnet brought into circuit by the closing of the circuit closer, and when the circuit closer is closed the horn or other alarm is sounded to indicate that the car is being driven by a thief, it being understood that in the circuit is a key-controlled switch which will be closed by the owner when he leaves the car unattended.

Still another object is the provision of a locking means for a spare tire, tool box or any other equipment which, when the lock is opened, will close the alarm circuit.

With such objects in view, and others which will appear as the description proceeds, the invention comprises various novel features of construction and arrangement of parts which will be set forth with particularity in the following description and claims appended hereto.

In the accompanying drawing, which illustrates one embodiment of the invention and wherein similar characters of reference indicate corresponding parts in both the views, Figure 1 is a diagrammatic view of the theft alarm system; and Fig. 2 is a detail view of the switch on the spare tire lock.

Referring to the drawing 1 designates a horn or other alarm which is of the electric type and is connected with a source of current 2, a switch-holding magnet 3, an automatic switch 4, and a key-controlled switch 5.

It is to be understood that the system will be installed on an automobile in some concealed and protected manner, and the switch 4 is adapted to be closed as soon as the car starts to move. For this purpose a lever or equivalent element 6 engages the movable contact 7 of the switch 4 to move such contact into engagement with the fixed contact 8, the lever 6 being moved by some moving part of the car, which, in the present instance, is indicated by the flywheel 9 engaging a friction wheel 10 fastened to a shaft 11 that carries a speed responsive means, such as weighted levers 12, these levers being associated with a longitudinally movable pin 13 that acts on the lever 6 to close the switch 4 when the weights of the levers 12 fly outwardly by the rotation of the shaft 11 when the car moves. After the switch 4 is closed the magnet 3 becomes energized and acts on the armature 14 carried by the lever 6, so that the said lever will maintain the switch 4 in closed-circuit condition, whereby the alarm 1 will continue to sound as long as the car is moving and whereby the attempted theft of the car will be revealed with a better chance of the thief being apprehended.

When the owner leaves his car he closes the switch 5 by means of a key 15 which causes the movable contact 16 of the switch 5 to move from the dotted to the full-line position, where it engages the fixed contact 17. This renders the circuit operative to cause the energizing of the alarm when the car is moved. In case there is an attempted theft while the switch 5 is closed, the current will flow from the battery 2 through the wire 18, switch contacts 8 and 7, which are closed by the speed responsive device 12, wires 19 and 20, magnet 3, wire 21, alarm device 1, wire 22, contacts 17 and 16, and battery 2.

Even though the car should be stopped by the thief, the alarm will continue to sound, since the magnet 3 holds the circuit closed, and it is only when the switch 5 is opened by the owner that the alarm will stop sounding. The continuous sounding of the alarm will give notice to the police authorities and the general public that the car is being driven by a thief and that he should be apprehended.

The system may include one or more theft-detecting devices, such as for the spare tires, tool box, and the like. In the present instance a lock 24 for a spare tire 25 is shown. This lock comprises two parts 26 and 27 connected by a hinge 28. On the part 27 is a contact 29 which is normally separated from the part 26 by insulation 30, and when the locking members are opened the contact 29 engages the part 26 to thereby close the alarm circuit, since such parts are connected by wires 32 and 31 with the magnet 3 and switch 4 and the battery 2. A padlock or equivalent means 33 may be employed to hold the locking members 26 and 27 together, and when this padlock is broken and the lock 24 opened, the alarm circuit will be closed to give a warning that the theft of a tire is attempted. The opening of a tool box or removal of any other part of the equipment can be similarly detected.

From the foregoing description taken in connection with the accompanying drawing, the advantages of the construction and method of operation will be readily understood by those skilled in the art to which the invention appertains, and while we have described the principle of operation, together with the device which we now consider to be the best embodiment thereof, we desire to have it understood that the device shown is merely illustrative and that such changes may be made when desired as fall within the scope of the appended claims.

Having thus described our invention, we claim as new and desire to secure by Letters Patent:

1. The herein described automatic actuating means for automobile theft alarms, the same comprising an electromagnet, a rigid member arranged in direct alinement with the axis of the magnet and slidable endwise toward the same, a lever pivoted adjacent to the magnet and having one arm thereof projecting into the space between the rigid member and the adjacent end of the magnet, a normally open switch one contact of which coöperates with the opposite end of the lever, said switch being electrically connected with the magnet, and means acting upon the rigid member to cause the endwise movement thereof toward the magnet and through the lever the closing of the switch when the automobile is moved.

2. The herein described automatic actuating means for automobile theft alarms, the same comprising an electromagnet, a pin arranged in alinement with the axis of the magnet and movable toward the same, a lever pivoted adjacent to the magnet and having one arm thereof projecting into the space between the pin and the adjacent end of the magnet, a normally open switch one contact of which is carried by a spring coöperating with the opposite end of the lever, said switch being electrically connected with the magnet, and speed controlled means acting upon the pin to cause the movement thereof toward the magnet and through the lever the closing of the switch when the automobile is moved.

DANIEL THOMAS KEENAN.
CATHERINE CELIA KEENAN.